Dec. 1, 1953

T. E. WOODRUFF 2,661,420

LINEAR SAWTOOTH GENERATOR

Filed Feb. 10, 1950

Inventor:
Thomas E. Woodruff,
by Merton D. Moore
His Attorney.

Patented Dec. 1, 1953 2,661,420

UNITED STATES PATENT OFFICE 2,661,420

LINEAR SAWTOOTH GENERATOR

Thomas E. Woodruff, Redondo Beach, Calif., assignor to General Electric Company, a corporation of New York Application February 10, 1950, Serial No. 143,488

4 Claims. (Cl. 250—27)

This invention relates to control circuits, and particularly of the type applicable to modifying the operation of signal wave generators.

The basis of many electrical timing circuits comprises the charging or discharging of a time constant circuit, of which one of the most fundamental and widely used types comprises a sawtooth generator. If accurate timing measurements are to be made it becomes desirable to maintain perfectly linear sweeps. Since the output of most conventional sweeps circuits is more or less exponential with time, as for example, the normal condenser charging characteristic, the need arises for correcting or modifying the inherent non-linearity. The problem of non-linearity correction is especially acute in the case where a sawtooth wave is desired having a relatively low repetition rate and a swing over a wide voltage range. In a particular application to Radio Sonde, an extremely linear sawtooth wave is desired for identifying the instantaneous position of scan of an electrode moving at a constant rate over a chart or recording material. Since the sawtooth wave must have a range in the order of zero to several hundred volts and be avaliable at the relatively slow repetition rate of several cycles per second, conventional methods of linearity control have been found unsatisfactory.

An object of my invention is to provide an improved timing circuit.

Another object of my invention is to provide an improved linear sawtooth wave at a desired recurrence rate.

Another object of my invention is to provide improved current and voltage regulating circuits for correcting the non-linearity of the charging and discharging of time constant circuits.

Figure 1:
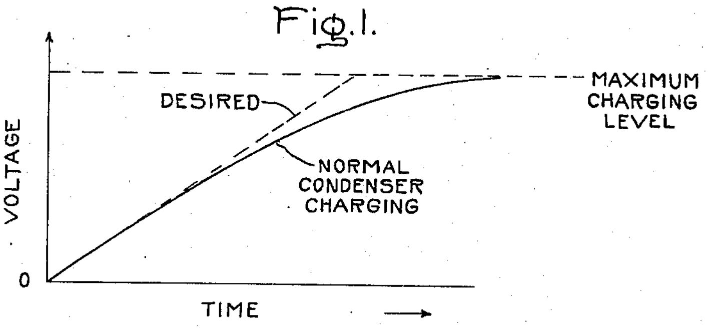
Figure 2:
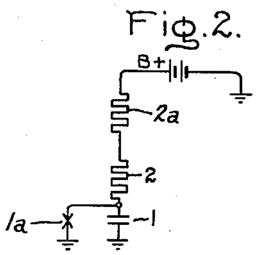

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawings wherein Fig. 1 illustrates the nature of the non-linearity of sawtooth waves which it desired to correct; Fig. 2 illustrates schematically one approach to correcting the non-linearity of the sawtooth wave in accordance with my invention; and Fig. 3 illustrates in circuit diagram form a preferred embodiment of my invention.

Referring to Fig. 1, there is shown a normal type charging curve for a storage device, for example, of the capacitive type. It is seen that the slope, while fairly linear during the early stage of the charging period, becomes progressively non-linear with time as the condenser charge reaches the applied voltage level. In order to provide the more linear charging characteristic shown, some form of correction is desirable. In the case of capacitor charging circuits one expedient commonly resorted to is to maintain the charging current through the condenser constant during the charging cycle. This involves a well known principle and finds its application in many types of circuits. My invention, however, is directed primarily to the basic structure disclosed in Fig. 2, wherein the condenser 1 is charged through resistors 2 and 2*a* from the positive terminal of voltage source indicated at B+. This type of circuit is capable of producing the non-linear sawtooth wave disclosed in Fig. 1 by discharging condenser 1 under control of switch 1*a* at a desired rate. In order to provide the more desirable linear charging curve shown, the following method is resorted to. If resistor 2 can be assumed constant with current or voltage, then if by some manner the voltage drop across resistor 2 or the current flowing through 2 can be maintained constant as by a controlled variation of the resistance 2*a* then constant current charging of condenser 1 may be assured.

Figure 3:
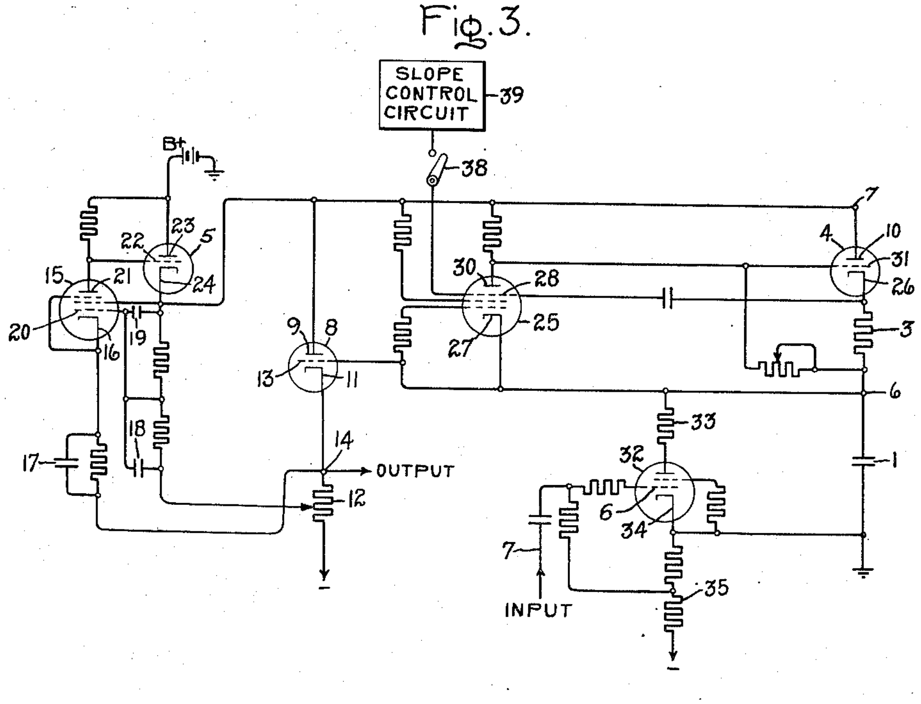

Referring to Fig. 3, the basic charging circuit is disclosed in the form of condenser 1, the cathode load resistance 3, the electron discharge path of device 4, and the electron discharge path of device 5, all connected across the B+ source. In order to maintain the voltage drop from terminal 7 through 6 constant as the voltage at terminal 6 rises with charging of condenser 1, it becomes necessary to raise the voltage at terminal 7 directly with the change at terminal 6. In accordance with the invention, this is accomplished by connecting device 8 as a cathode follower with its anode electrode 9 coupled to the anode electrode 10 of device 4 and its cathode electrode 11 coupled through the normal cathode load resistor 12 to a source of negative voltage. The grid 13 of the cathode follower device 8 is connected directly to terminal 6. The problem has now resolved itself to maintaining a constant difference in potential between electrodes 13 and 9 of device 8.

As the voltage at terminal 6 and consequently electrode 13 of device 8 rises in accordance with the normal non-linear sawtooth charging characteristic thereby increasing the anode cathode current in device 8, the voltage at terminal 14 rises accordingly in normal cathode follower fashion. The problem now resolves itself to maintaining the voltage from anode 9, and hence terminal 7, to terminal 14 constant. For this purpose a voltage regulator circuit comprising tubes 5 and 15 is employed. When the B+ voltage is applied to devices 5 and 15, current flows through devices 5 and 4 charging condenser 1. The increasing voltage on condenser 1 is supplied between the control grid 13 of device 8 and ground, and the voltage on resistance 12, in the cathode lead of this device, is supplied through condenser 17 between the cathode of the voltage regulator tube 15 and ground so that the voltage on that cathode varies directly with the voltage on condenser 1. To compensate for decrease in grid to cathode bias of device 8 and any other circuit non-linearities, the voltage at cathode 11 is also applied through condenser 18 to the control electrode 20 of the voltage regulator device 15. Thus the grid to cathode voltage increases with an applied positive going sawtooth wave, thereby decreasing the plate current through tube 15, and hence causing a rising plate voltage at anode 21 with respect to ground. Since the plate 21 of tube 15 is connected to the grid 22 of tube 5, the grid voltage of tube 5 also rises, thus decreasing the effective tube resistance of tube 5 and hence decreasing the voltage drop across the tube. Since the anode electrode 23 of tube 5 is connected to B+, the voltage at cathode 24 thereof also rises thereby maintaining the voltage between cathode 24, and hence terminal 7, and terminal 14 constant. To eliminate B+ voltage variations in effecting the regulator action of devices 5 and 15, degenerative feedback is provided by coupling cathode 24 through condenser 19 to grid 20.

By use of applicant's invention as thus far described, the current through the condenser may be maintained constant to better than 1% for a condenser charge varying between zero and 150 volts. In this instance it has been assumed that the tube resistance of tube 4 and resistor 3 in series have been substantially constant such that they may be replaced with a fixed resistor. However, in order to hold the current through condenser 1 constant to closer limits, the following arrangement may be resorted to. Devices 4 and 25 may be provided in the form of constant current regulator circuit resulting effectively in applying the constant voltage circuit comprising devices 5, 8 and 15 across the constant current circuit comprising devices 4 and 25. In the event of an increase in current flowing through device 4 and resistance 3, the voltage drop across resistance 3 would tend to raise the cathode 26 to a higher level with respect to ground. This rise in voltage drop across resistance 3 is applied between the cathode 27 of device 25 and the suppressor grid 28 thereof because of the coupling through condenser 29. The plate current of device 25 will therefore increase and the potential at plate electrode 30 will decrease. Since the grid 31 of device 4 is directly connected to anode 30, this decrease in voltage will cause the internal resistance of device 4 to increase, thereby decreasing the flow of current through it. This effect counteracts the original increase in current that started the regulating process. By the addition of this constant current circuit, the variation in charging current through condenser 1 may be reduced considerably below 1%.

Returning to the current regulator circuit, the suppressor grid 28 of device 25 is employed to control the plate voltage of this device. The voltage stored on condenser 29 tied between the suppressor grid 28 and the cathode 26 of device 4 determines the internal impedance of device 4. If it is desirable to control the slope of the sawtooth wave being generated, the current flowing through device 4 may be controlled accordingly. Hence provision may be made for changing the direct voltage level on condenser 29 if necessary. By closing switch 38, condenser 29 is connected across a source of unidirectional voltage available from slope control circuit 39. If the correction to the slope is made periodic, by operation of switch 38, then the voltage stored on the condenser 29 must not change substantially during this period. For this reason, the condenser 29 is tied to the suppressor 28. Grid current is very minute because it is well shielded from ion current within the tube by the screen grid.

In order to terminate the charging of condenser 1 and hence determine the width of the sawtooth wave being generated, a thyratron 32 is connected between ground and terminal 6. The cathode 34 of this device is connected directly to ground and the anode is connected through loading resistor 33 to terminal 6. Device 32 is normally cut off by a negative bias applied to its grid 36 through resistor 35 from an external source not shown. Upon the appearance of a positive going trigger voltage on lead 37 coupled to the grid 36 of device 32, the gaseous device conducts, thereby substantially instantaneously to discharge condenser 1 through resistor 33 and the anode cathode circuit of tube 32. Since the plate voltage for tube 32 is effectively derived from the charge on condenser 1, conduction of tube 32 ceases with discharge of condenser 1 until a subsequent trigger arrives.

The output voltage is preferably taken from the cathode follower at terminal 14. This cathode follower is particularly linear in that the plate voltage is rising at the same rate as the grid voltage.

While I have shown and described particular embodiments of my invention, it will be obvious to those skilled in the art that various changes and modifications may be made without departing from my invention in its broader aspects and I, therefore, intend in the appended claims to cover all such changes and modifications as fall within the true spirit and scope of my invention.

What I claim as new and desire to secure by Letters Patent of the United States is:

1. A sawtooth generator comprising a condenser in series circuit with an impedance, a first and second electron discharge device, said impedance comprising the cathode load impedance of said first device, a unidirectional voltage source, means for energizing said series circuit from said source, means coupled to the junction of said condenser and said impedance, and responsive to the charging of said condenser for maintaining the voltage drop across said first electron discharge device and load impedance substantially constant, and further means responsive to the voltage drop across said cathode load impedance during said condenser charging for adjusting the effective resistance of said first device to maintain the voltage drop across said load impedance constant.

2. A wave generator comprising a storage device, a unidirectional voltage source, means for charging said storage device comprising means coupling said device in series circuit with a fixed resistance and a first and second variable resistance across said source, means responive to the charge across said storage device for varying said second variable resistor to maintain the voltage across said fixed and first resistances substantially constant, and means responsive to variation in the voltage drop across said fixed resistance for varying the resistance of said first resistance to maintain the voltage drop across said fixed resistance constant.

3. A wave generator comprising a storage device, a unidirectional voltage source, means coupling said storage device in series circuit with a fixed resistance and a first and second variable resistance in that order across said source, an electron discharge device comprising anode, grid and cathode electrodes, means for coupling said anode electrode to the junction of said first and second variable resistances, means for coupling said grid electrode to the junction of said storage device and fixed resistance, means for connecting said cathode through a cathode resistance to a negative potential point, means responsive to said storage voltage wave reproduced on said cathode resistance for maintaining the anode-to-cathode electrode voltage substantially constant during charging of said storage device, and means responsive to variation in the voltage drop across said fixed resistance for varying the resistance of said second resistance to maintain the voltage drop across said fixed resistance substantially constant.

4. A sawtooth generator comprising a capacitor, a fixed resistance, a first electron discharge device having an input and an output circuit, a second electron discharge device having an input circuit and an output circuit, a source of unidirectional potential, said capacitor said resistor the output circuit of said first electron discharge device the output circuit of said second electron discharge device all connected in series across said source, a third electron discharge device having an anode, a cathode and a control grid, said anode connected to the junction of the output circuits of said first and second electron discharge devices, said grid connected to the junction of said fixed resistance and said capacitor, said cathode connected through a cathode resistance to a negative potential point, means for applying the capacitor charging voltage reproduced across said cathode resistance to the input circuit of said second electron discharge device thereby maintaining the voltage across the first electron discharge device and said fixed resistance substantially constant during the charging of said capacitor, means responsive to variations in voltage across said fixed resistance for varying the resistance of the output circuit of said first electron discharge device to maintain the voltage drop across said fixed resistor substantially constant during the charging of said capacitor.

THOMAS E. WOODRUFF.

References Cited in the file of this patent

UNITED STATES PATENTS

| Number | Name | Date |
|---|---|---|
| 2,419,606 | Stodola | Apr. 29, 1947 |
| 2,448,069 | Ames, Jr. | Aug. 31, 1948 |
| 2,448,070 | Sunstein | Aug. 31, 1948 |
| 2,452,683 | Rieke | Nov. 2, 1948 |
| 2,453,787 | Downs | Nov. 16, 1948 |
| 2,532,534 | Bell | Dec. 5, 1950 |